Aug. 14, 1962   E. V. BUNTING   3,049,179
IMPLEMENT HITCH LINKAGE FOR TRACTORS
Filed Nov. 3, 1958   3 Sheets-Sheet 1

INVENTOR.
ERNEST V. BUNTING
BY
ATTORNEYS.

Aug. 14, 1962   E. V. BUNTING   3,049,179
IMPLEMENT HITCH LINKAGE FOR TRACTORS
Filed Nov. 3, 1958   3 Sheets-Sheet 3

INVENTOR.
ERNEST V. BUNTING
BY Carlson, Pitzner,
Hubbard & Wolfe
ATTORNEYS.

United States Patent Office 3,049,179
Patented Aug. 14, 1962

3,049,179
IMPLEMENT HITCH LINKAGE FOR TRACTORS
Ernest V. Bunting, Detroit, Mich., assignor to Massey-Ferguson Inc., Racine, Wis., a corporation of Maryland
Filed Nov. 3, 1958, Ser. No. 771,453
6 Claims. (Cl. 172—10)

The invention relates to hitch linkages for coupling implements to tractors and it is more particularly concerned with hitch linkages for use with tractors equipped with power operated means and controls for automatically raising and lowering the linkage and attached implement to regulate the working depth of the latter so as to maintain a substantially uniform draft load on the linkage.

With the introduction of higher powered tractors of the above general character has come the problem of providing for the connection of larger and heavier implements. The problem is further complicated by the increasingly wide ranges of implements such tractors are expected to accommodate. Additional problems are encountered when the tractor is equipped with oversized wheels to provide high clearance as this raises the hitch point of the linkage and materially alters the line of draft between the tractor and the implement.

One object of the invention is to provide a hitch linkage adapted for coupling implements of widely varying sizes and weights to a tractor and which maintains the proper geometrical relationship between the tractor and the implement for most efficient operation of the latter.

Another object is to provide a hitch linkage adapted for use without any structural changes with either a high or a low clearance tractor and which in either environment provides the proper line of draft for fast initial penetration, better traction at working depth and high implement ground clearance for transportation.

A more specific object is to provide improved means by which the leverage between the implement and the draft responsive mechanism of the tractor may be varied as required for the particular operating characteristics of the coupled implement.

Other objects and advantages of the invention will become apparent from the following detailed description of the preferred embodiment illustrated in the accompanying drawings in which FIGURE 1 is a side elevational view of a tractor equipped with hitch linkage embodying the features of the invention.

Figure 1:
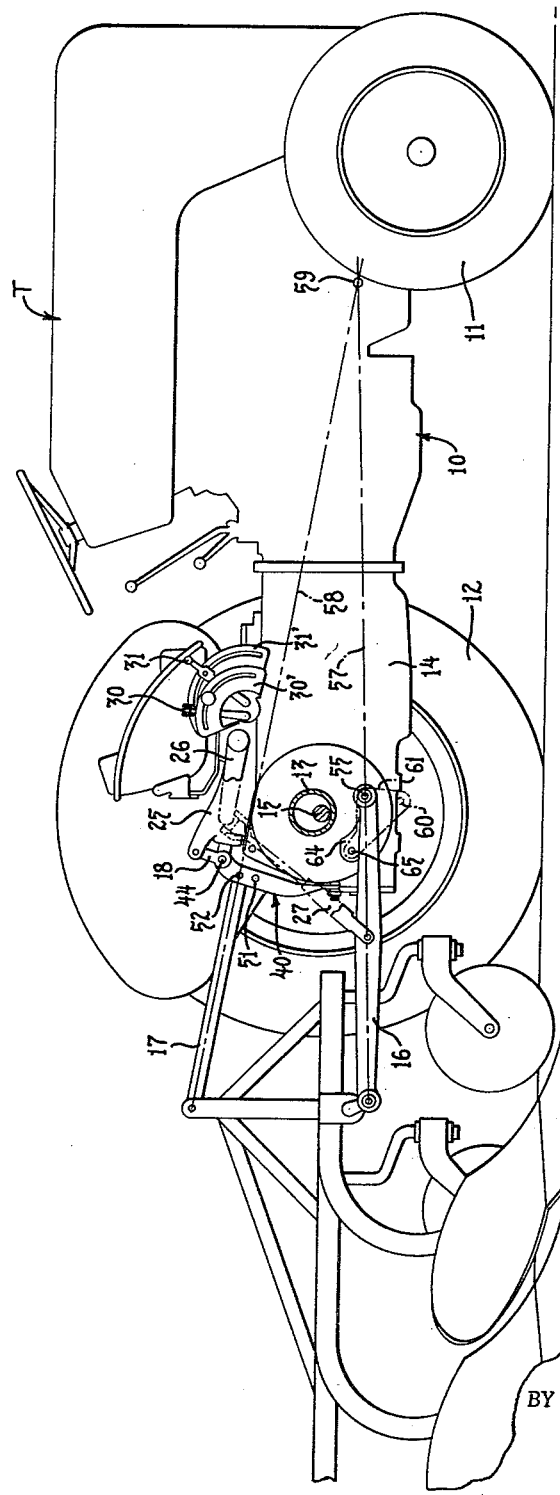

While a single preferred embodiment of the invention has been shown in the drawings and will be described herein in detail, there is no intention to limit the invention to the particular structure shown. The intention is to cover all modifications and adaptations falling within the spirit and scope of the invention as more broadly or generally characterized in the appended claims.

For purposes of illustration the invention has been shown as incorporated in a tractor T which will be recognized as a Ferguson tractor. The tractor shown has an elongated body 10 supported by four wheels including front steering wheels 11 and rear drive wheels 12. The latter are carried on axle housings 13 secured to and extending laterally from opposite sides of a center housing 14, which constitutes the rear portion of the tractor body. As is customary in tractors of the type illustrated, the center housing defines a compartment for the differential through which the wheels 12 are driven by means of axle shafts 15 extending through the respective axle housings. The center housing 14 also defines a compartment for the power unit and controls for raising and lowering a trailing implement hitch linkage.

In general, the hitch linkage provided on tractors of the type under consideration comprises of a pair of lower or draft links 16 and a top or control link 17. The draft links are spaced apart laterally while the top link is located above and substantially midway between the draft links. They are thus arranged for connection with the tractor and with an implement at the three points of a triangle, the links all diverging relative to a point adjacent the front of the tractor so that the spacing of the implement connections is substantially greater than the spacing of the corresponding connections to the tractor.

Figure 2:
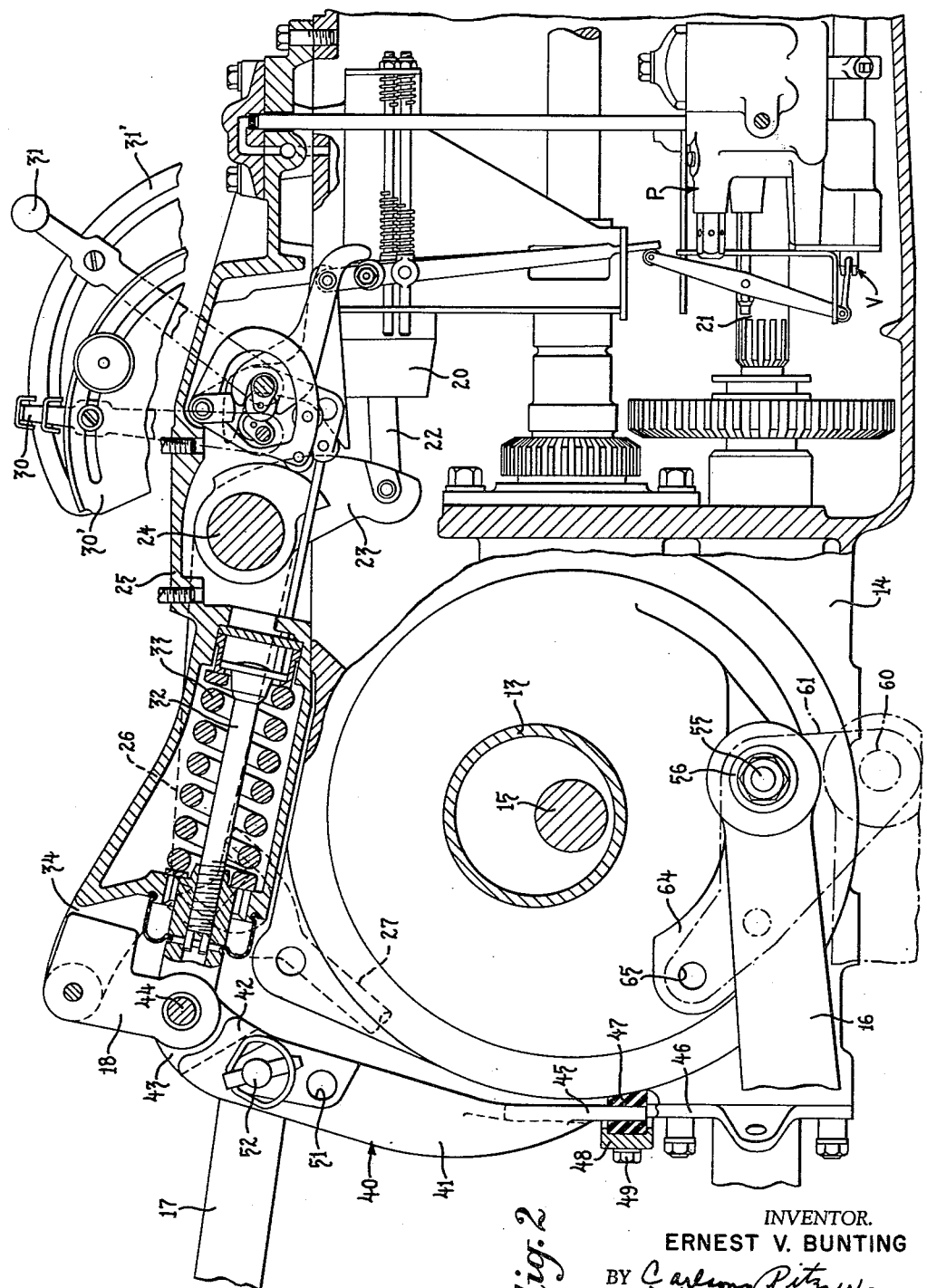
FIG. 2 is a fragmentary longitudinal sectional view through the center housing of the tractor shown in FIG. 1.

Each of the links of the hitch linkage is universally pivoted to the tractor and universal pivot connections are also provided with the implement so that the hitch can swing freely. The pivots for the draft links are located on the tractor body below and slightly forward of the rear axle as shown in FIG. 2. A rocker member 18 pivoted on a rearward extension of the tractor body and pivotally connected with a shiftable element of the controls is provided for attachment of the top link 17 when ordinary implements are coupled to the tractor.

The tractor T is equipped with a power unit and controls for swinging the hitch links vertically between working and transport positions and for raising and lowering the linkage to regulate the working depth of the implement. In the exemplary tractor the power unit and controls illustrated are similar to those disclosed and claimed in my copending application, Serial No. 451,276, filed August 20, 1954, now Patent No. 2,996,124, issued August 15, 1961. Briefly, the power unit comprises a one-way hydraulic ram including a cylinder 20 (FIG. 2) mounted within the center housing of the tractor. Pressure fluid is directed to and exhausted from the ram cylinder under control of a valve V. The pressure fluid is supplied in this instance by a pump P driven from the tractor engine by a shaft 21.

As shown in FIG. 2, the ram cylinder 20 faces rearwardly of the tractor and its working piston is connected by a rod 22 with a crank arm 23 fixed to transverse shaft 24 journalled in a cover plate 25 rigidly secured to the open top of the center housing 14. The ends of the shaft 24 project at opposite sides of the cover plate and carry lift arms 26 adapted to be connected by drop links 27 with the draft links 16 of the hitch linkage.

Actuation of the valve V to control the operation of the power unit is effected jointly by manually operated and draft responsive control means acting through a valve operating linkage. The linkage shown is similar to that disclosed in my copending application above referred to and a detailed description here is believed to be unnecessary. For present purposes it is sufficient to note that the manually operable means includes a pivoted hand lever 30 which is settable relative to a quadrant 30" to determine the draft load to be maintained on the hitch linkage.

A second pivoted hand lever 31 pivoted to swing relative to a quadrant 31' is operable in its upper range of movement to actuate the valve V in a manner such that the hitch linkage is raised or lowered in positional agreement with the hand lever. When the hand lever 31 is moved into its lower range, the implement mounted on the hitch linkage is lowered to the ground and control of the valve V is taken over by the draft responsive means. In this lower range, the hand lever 31 is settable to selectively determine the rate at which the hitch linkage and attached implement descend when a lowering movement is called for by the draft responsive means.

The draft responsive means as shown includes an axially shiftable plunger 32 operatively connected at one end to the valve operating linkage and pivoted at its other end to the rocker 18. A heavy coil spring 33 is arranged to resist movement of the plunger in either direction by compression or tension loads applied to its pivoted end. In the exemplary tractor the plunger and spring are enclosed in a compartment formed in the cover plate 25. An extension of the cover plate in the form of spaced ears 34 provides pivotal support for the rocker 18.

The control forces as well as the draft forces generated by different implements vary according to their size, weight and operating characteristics. In accordance with one aspect of the invention provision is made for connecting the top link 17 of the hitch linkage with the control plunger 32 in a manner which permits the leverage ratio to be varied to suit the requirements of the particular implement coupled to the tractor. More particularly, the connection is effected through the medium of a beam 40 fulcrumed at one end on the tractor body and having a pivotal connection with the control plunger. To provide the variable leverage ratio the beam has provisions for attachment of the top link 17 at a plurality of selected points spaced longitudinally of the beam.

Figure 3:
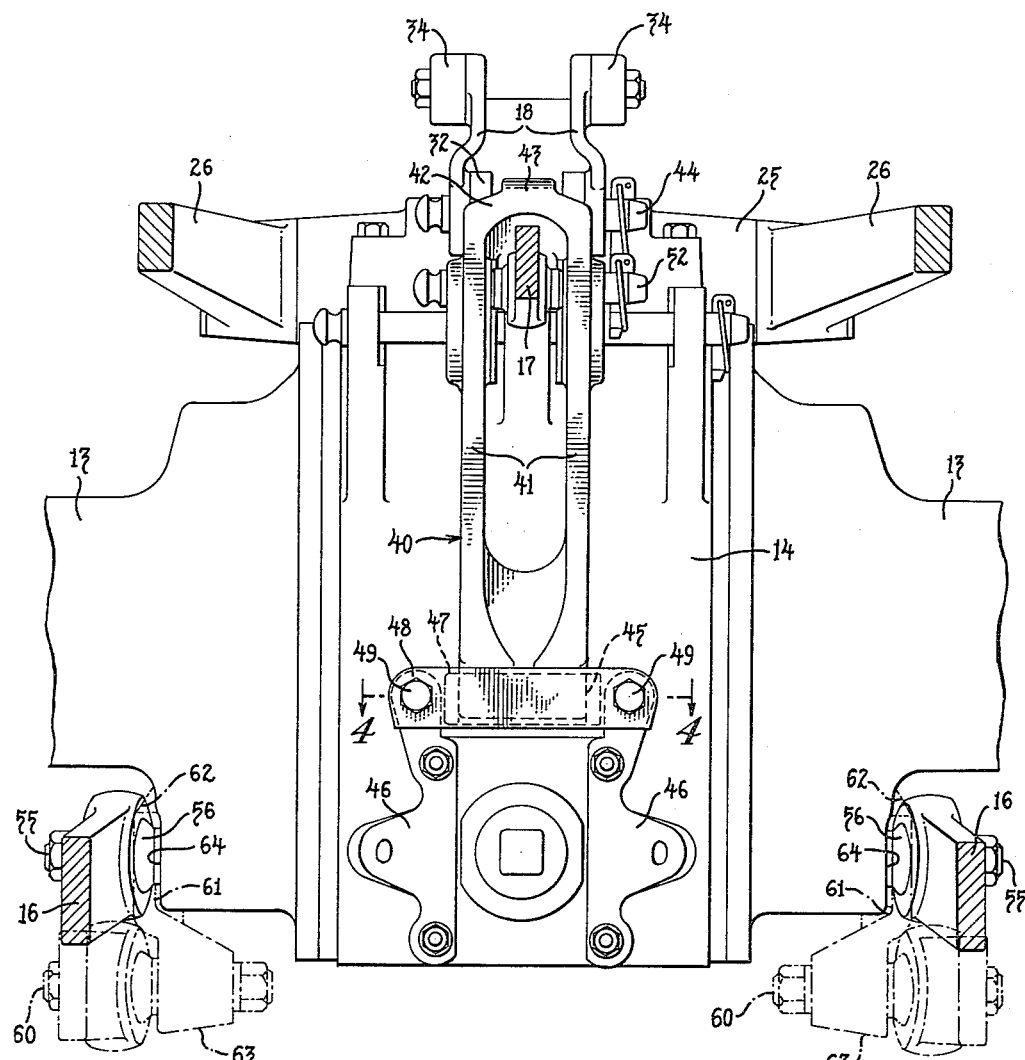
FIG. 3 is a fragmentary rear view of the tractor with the hitch links and lift arm shown in section.
Figure 4:
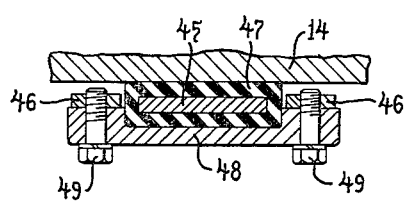
FIG. 4 is a fragmentary sectional view taken in a plane substantially on the line 4—4 of FIG. 3.

In the preferred form shown in FIGS. 2 and 3 of the drawings, the beam 40 comprises a pair of spaced parallel side members 41 joined at their upper ends by a cross member 42. As shown in FIG. 3, the cross member has a forwardly and upwardly projecting ear 43 adapted to fit into the bifurcated end of the plunger 32 embraced between two legs on the rocker 18. A pin 44 inserted through alined apertures in the parts pivotally secures them all together.

At their lower ends the side members are rigidly joined with a flat tongue 45 provided with a fulcrum on the tractor body which affords limited pivoting and endwise movement to accommodate the swinging of the beam with the rocker 18. The fulcrum for the tongue is provided in this instance by a pair of brackets 46 spaced apart to accommodate the tongue and bolted to the rear face of the center housing 14. The tongue is fitted with a bushing or sleeve 47 of rubber or other suitable resilient material adapted to be tightly clamped between the wall of the center housing and a cross member 48 secured to the brackets 46 as by machine screws 49.

The beam 40 constitutes a variable ratio lever adapted to be interposed between the top link 17 of the hitch linkage and the control plunger 32 of the tractor. To this end, the side members 41 of the beam are formed with a series of alined apertures 51 spaced apart longitudinally of the beam for the reception of a pin 52 pivotally connecting the top link to the beam. While the exemplary beam has been shown as formed with two sets of apertures 51, it will be appreciated that additonal sets of apertures may be provided if desired.

It will be evident that the beam 40 is operative to transmit tension as well as compression forces from the top link 17 to the control plunger 32 by reason of its resilient fulcrum on the tractor body. It thus enables the automatic draft responsive means of the tractor to function with very large and heavy implements whose weight overbalances the forwardly directed or compressive forces imposed on the top link by the ground forces reacting on the implement. The control system of the exemplary tractor is equipped with a double acting control spring to take full advantage of this characteristic of the hitch linkage.

The variable connection of the top link provided by the beam permits the implement to be coupled to the tractor to provide the line of draft required for fast implement penetration which changes as the implement goes into the ground to increase the traction on the tractor drive wheels. It also provides high implement ground clearance when the hitch linkage is raised to transport position. Moreover, the implement may be connected to the tractor so as to provide the proper rate of response of the power unit required to maintain the implement substantially at the desired working depth. Thus, in the case of a heavy implement or one that tends to penetrate rapidly, the top link may be connected at the lower set of the apertures 51. The control force from the implement is thus reduced as it is relayed to the control plunger by the top link and corrective action of the power unit requires a relatively large force at the top link. With lighter implements or implements that penetrate more slowly, the top link may be connected with upper apertures 51. When so connected smaller forces at the top link are required to bring about corrective action of the power unit.

According to another aspect of the invention, provision was made for connecting the hitch linkage to the tractor so that the proper geometrical relations are maintained when the tractor is equipped with either standard or high clearance wheels. As in conventional tractors, outwardly projecting coupling pins 55 are provided on the lower portion of the tractor body at opposite sides of the center housing for engagement in the apertured balls 56 socketed in the ends of the draft links 16. The pins are located below and slightly forward of the tractor rear axle as shown in FIGS. 1 and 2. In practice the vertical positioning of the pins is such that when the tractor is equipped with standard size wheels, the line of draft on the implement is sufficiently low to insure fast penetration of the ground. When the implement reaches its working depth the line of draft is raised somewhat substantially to the position indicated by the broken line 57 in FIG. 1 to increase the traction on the drive wheels 12. The top link 17 is connected to the beam 40 at a point such that the line of force transmitted through that link, if extended as at 58, would intersect the extended line of draft 57 at a point 59 in the vicinity of the front axle of the tractor.

When the tractor is equipped with larger diameter wheels to provide higher clearance, the coupling pins 55 are raised a corresponding distance above their normal position. This, of course, would change the line of draft substantially and might seriously affect both the penetrating and operational characteristics of the tool. To maintain the low line of draft desirable for rapid implement penetration, auxiliary mounting pins 60 are provided for the attachment of the draft links 16. The pins 60 are carried by brackets 61 herein shown as generally triangular in shape and having a socket 62 at one corner for mounting on the regular hitch connecting pins 55. The portion of the bracket to which the auxiliary pin 60 is anchored is offset inwardly as at 63 so that the auxiliary pin is presented in the same vertical plane as the pin 55 and the normal geometry of the hitch linkage is maintained. Moreover, the pin 60 is spaced downwardly from the socket 56 a distance corresponding to the amount the tractor body and the pin 55 are raised by the high clearance wheels.

To accommodate the bracket 61, each of the axle housings 13 has a flat mounting surface 64 recessed into the flaring or trumpet shaped end attached to the center housing. The pin is located adjacent the forward end of the surface 64 and the bracket 61 is thus enabled to seat against the surface. A third corner of the triangular bracket is apertured as at 65 for the reception of a screw threading into a registering aperture in the axle housing to retain the bracket in place.

When the draft links 16 are connected to the tractor by means of the pin 60, the desired geometrical relationship of the linkage may be established by connecting the top link 17 to an appropriate set of the apertures in the beam 40. Accordingly, the beam cooperates with the bracket 61 in adapting the linkage for efficient operation with either high or low clearance tractors.

I claim as my invention:

1. The combination with a tractor having a spring loaded control plunger and an implement hitch linkage including draft links and a control link, means for connecting the control link with the plunger comprising an elongated beam pivotally connected at one end to the plunger, a resilient sleeve mounted on the other end of said beam, and means to clamp said sleeve against the body of the tractor to provide a fulcrum about which the beam may swing upon application thereto of either compression or tension forces, and means for connecting the control link to said beam at any one of a plurality of longitudinally spaced points.

2. The combination with a tractor having a spring loaded control plunger and an implement hitch linkage including draft links and a control link, means for connecting the control link with the plunger comprising an elongated beam pivotally connected at one end to the plunger, a resilient sleeve mounted on the other end of said beam, a pair of brackets fixed to the tractor body and spaced apart to receive between them said one end of the beam and said resilient sleeve, a cross member secured between said brackets operative to engage said sleeve and clamp it against the tractor body to define a fulcrum permitting limited endwise and swinging movements of the beam, and means for connecting the top link with said beam at selected points spaced apart longitudinally of the beam.

3. The combination with a tractor having a spring loaded axially shiftable control plunger having one end pivoted to the swinging end of a rocker member pivoted on the tractor body, and an implement hitch linkage including draft links and a control link, an elongated beam pivotally connected at one end to said rocker on the same pivotal axis as said plunger, means for pivotally connecting the control link to said beam at selected longitudinally spaced points along its length, and means providing a fulcrum for the other end of said beam on the tractor body upon which the beam may pivot under compression or tension forces applied through the top link, said fulcrum means also providing for limited endwise movement of the beam to accommodate the arcuate movement of the end of the rocker to which the beam is pivotally attached.

4. The combination with a tractor having a spring loaded axially shiftable control plunger having one end pivoted to the swinging end of a rocker member pivoted on the tractor body, and an implement hitch linkage including draft links and a control link, an elongated beam pivotally connected at one end to said rocker on the same pivotal axis as said plunger, means for pivotally connecting the control link to said beam at selected longitudinally spaced points along its length, a sleeve-like element of resilient material carried on the other end of said beam, and means for clamping said element to the tractor body to define a fulcrum upon which said beam can pivot to shift the control plunger either forwardly or rearwardly, the resilience of said element permitting limited endwise movement of the beam to accommodate the arcuate path defined by its other end in swinging with said rocker.

5. The combination with a tractor having a spring loaded control plunger and an implement hitch including a pair of laterally spaced draft links and an upper control link, means for connecting the draft links to the tractor at either of two vertically spaced points, an elongated beam pivotally connected at one end to the control plunger and having its other end depending at the back of the tractor, a resilient sleeve mounted on said other end of the beam, means to clamp said sleeve against the body of the tractor to provide a fulcrum about which the beam may swing upon application thereto of either compression or tension forces, and means for connecting the control link with said beam at any one of a series of points spaced apart longitudinally of the beam to provide the desired geometrical relationship between the links when the draft links are connected at either of said two spaced points on the tractor.

6. In a tractor having a spring loaded control plunger and an implement hitch linkage including draft links and a control link, the combination comprising, an elongated beam pivotally connected at one end to the plunger, means for connecting the other end of said beam to the tractor, said means supporting the beam for swinging movement upon application of either compression or tension forces thereto whereby the control plunger is shifted rearwardly or forwardly along a path from a central position, said means also supporting the beam for limited endwise movement of the beam whereby movement of the control plunger along said path is not interfered with, and means for operatively connecting the control link with said beam at a point along its length.

References Cited in the file of this patent

UNITED STATES PATENTS

| | | |
|---|---|---|
| 2,616,349 | Lindeman et al. | Nov. 4, 1952 |
| 2,624,257 | Brock | Jan. 6, 1953 |
| 2,659,286 | Metzger | Nov. 17, 1953 |
| 2,698,564 | Sawyer | Jan. 4, 1955 |
| 2,721,509 | Klemm et al. | Oct. 25, 1955 |
| 2,786,403 | Senkowski et al. | Mar. 26, 1957 |
| 2,900,030 | Edman | Aug. 18, 1959 |
| 2,907,394 | Cook | Oct. 6, 1959 |